United States Patent
Sinha et al.

(10) Patent No.: US 12,505,262 B2
(45) Date of Patent: Dec. 23, 2025

(54) SYSTEMS AND METHODS FOR DETECTING AND PREDICTING FAULTS IN AN INDUSTRIAL PROCESS AUTOMATION SYSTEM

(71) Applicant: Schneider Electric Systems USA, Inc., Foxborough, MA (US)

(72) Inventors: Bhaskar Sinha, Hyderabad (IN); Amitabha Bhattacharyya, Hyderabad (IN); Mukund Seshadri, Foxborough, MA (US)

(73) Assignee: Schneider Electric Systems USA, Inc.

( * ) Notice: Subject to any disclaimer, the term of this patent is extended or adjusted under 35 U.S.C. 154(b) by 464 days.

(21) Appl. No.: 17/442,433

(22) PCT Filed: Mar. 24, 2020

(86) PCT No.: PCT/US2020/024508
§ 371 (c)(1),
(2) Date: Sep. 23, 2021

(87) PCT Pub. No.: WO2020/198256
PCT Pub. Date: Oct. 1, 2020

(65) Prior Publication Data
US 2022/0187815 A1   Jun. 16, 2022

Related U.S. Application Data

(60) Provisional application No. 62/842,929, filed on May 3, 2019, provisional application No. 62/823,377, filed
(Continued)

(51) Int. Cl.
*G06F 30/12* (2020.01)
*G05B 17/02* (2006.01)
(Continued)

(52) U.S. Cl.
CPC ............. *G06F 30/12* (2020.01); *G05B 17/02* (2013.01); *G05B 19/0426* (2013.01);
(Continued)

(58) Field of Classification Search
CPC ................ G05B 17/02; G05B 19/0426; G05B 19/41885; G05B 23/0221; G05B 23/0243;
(Continued)

(56) References Cited

U.S. PATENT DOCUMENTS 6,466,893 B1 * 10/2002 Latwesen ........... G05B 23/0229
702/41
7,389,204 B2   6/2008 Eryurek et al.
(Continued)

FOREIGN PATENT DOCUMENTS

CN          102539129 A      7/2012
WO   WO-2018234741 A1 * 12/2018 ........... G06F 9/5072

OTHER PUBLICATIONS

EP Extended Search Report for EP Application No. 20720225.0 dated Oct. 20, 2021.
(Continued)

*Primary Examiner* — Lisa M Caputo
*Assistant Examiner* — Eric Sebastian Von Wald
(74) *Attorney, Agent, or Firm* — FIG. 1 Patents

(57) ABSTRACT

Systems and methods for detecting and predicting faults in an industrial process automation system use trend data to forecast alerts and allow action to be taken before a problem occurs. The systems and methods provide fault/failure predictions that improve over time as more empirical data is collected for a related set of system components. The systems and methods may identify relationships among the components of a process automation system; identify and collect changes to system configuration; identify and collect data to inform reliability and predictive models; develop a
(Continued)

domain-specific predictive model for one or more components that allows for component-based failure or degradation prediction; develop a system-predictive model that leverages reliability and criticality relationships, component-based predictions and operating parameters to predict the health of a part of or the entire process automation system; deliver a prioritized alert system; and identify root-cause failures of a component.

19 Claims, 10 Drawing Sheets

Related U.S. Application Data on Mar. 25, 2019, provisional application No. 62/823,469, filed on Mar. 25, 2019.

(51) Int. Cl.
*G05B 19/042* (2006.01)
*G05B 19/418* (2006.01)
*G05B 23/02* (2006.01)
*G06F 30/27* (2020.01)
*G06N 5/022* (2023.01)

(52) U.S. Cl.
CPC ... *G05B 19/41885* (2013.01); *G05B 23/0221* (2013.01); *G05B 23/0243* (2013.01); *G05B 23/027* (2013.01); *G05B 23/0272* (2013.01); *G05B 23/0281* (2013.01); *G06F 30/27* (2020.01); *G06N 5/022* (2013.01); *G05B 2219/23008* (2013.01); *G05B 2219/23067* (2013.01); *G05B 2219/23272* (2013.01); *G05B 2219/23278* (2013.01)

(58) Field of Classification Search
CPC .............. G05B 23/027; G05B 23/0272; G05B 23/0281; G05B 2219/23008; G05B 2219/23067; G05B 2219/23272; G05B 2219/23278; G05B 23/024; G05B 13/0265; G05B 19/4063; G05B 19/4065; G05B 2219/33321; G05B 2219/34477; G05B 2219/37214; G05B 2219/50185; G05B 2219/24065; G05B 2219/32015; G05B 2219/32352; G05B 23/0208; G06F 30/02; G06F 30/27; G06F 11/3476; G06F 18/214; G06F 2201/86; G06F 17/18; G06N 5/022; G06N 3/08; G07C 3/00; G09B 25/02; H04W 4/38

See application file for complete search history.

(56) References Cited

U.S. PATENT DOCUMENTS

| | | | |
|---|---|---|---|
| 10,649,449 B2 | 5/2020 | Bell et al. | |
| 2002/0087258 A1* | 7/2002 | Johnson | F02B 77/08 701/114 |
| 2002/0163427 A1* | 11/2002 | Eryurek | G05B 23/027 340/500 |
| 2003/0046027 A1* | 3/2003 | Kitamura | G21C 17/00 702/182 |
| 2005/0197805 A1 | 9/2005 | Eryurek et al. | |
| 2009/0287339 A1* | 11/2009 | Shimshi | G05B 23/0272 700/110 |
| 2014/0108792 A1* | 4/2014 | Borzycki | H04L 67/63 713/165 |
| 2015/0105876 A1* | 4/2015 | Tran | G05B 23/0272 700/83 |
| 2017/0102696 A1* | 4/2017 | Bell | G05B 23/0275 |
| 2017/0353352 A1* | 12/2017 | Nicholas | H04W 4/50 |
| 2018/0136019 A1* | 5/2018 | Deshpande | G01D 18/002 |
| 2018/0174248 A1* | 6/2018 | Karra | G05B 19/41855 |
| 2018/0210436 A1* | 7/2018 | Burd | G05B 23/0294 |
| 2018/0330338 A1* | 11/2018 | Holden | G05B 23/0283 |
| 2020/0103888 A1* | 4/2020 | Sayyarrodsari | G05B 17/02 |

OTHER PUBLICATIONS

PCT Search Report and PCT Written Opinion dated PCT/US2020/024508 dated Jun. 26, 2020.

Yun et al., "Plant-Wide Diagnosis: Cause-and-Effect Analysis Using Process Connectivity and Directionality Information Table of Contents", dated Jan. 1, 2012; retrieved from the internet, https://workspace.imperial.ac.uk/centreforprocesssystemsengineering/Public/PHDThesis/2011PhDThesis/lyun-OE-2012=PhD-Thesis.pdf.

* cited by examiner

| Analysis Period: | 09/04/2018 12:00 AM - 09/07/2018 11:59 pm ▼ | | Search: | |
|---|---|---|---|---|
| Date | Device | Severity | Message | |
| 2018-09-05 | 012108 | ⊙ | 01CP21 has FBM problem with probability of 39%. | The device may fail within 3 days. |
| 2018-09-06 | 012108 | ⊙ | 01CP21 has FBM problem with probability of 78%. | The device may fail within 2 days. |
| 2018-09-07 | 012108 | ⊙ | 01CP21 has FBM problem. | The device has failed or may fail soon. |
| 2018-09-08 | 01CP21 | ⊙ | 01CP21 has Hardware issue. | |

FIG. 7

```
Log Messages...
2018-08-05 14:50:00    TT2061 changing Topology
2018-08-05 14:54:17    Equip = P04 SYSMON -00040 Equipment off-line
2018-08-05 19:35:00    TT2061 changing Topology [ Count=126 ]
2018-08-05 19:35:00    KM0043 searching for TT2061 [ Count=3 ]
2018-08-05 19:35:00    System[1]GBIC 17 indicated TX [ Count=159 ]
2018-08-05 19:38:07    Equip = P17 SYSMON -00040 Equipment off-line
2018-08-05 19:38:13    Equip = P17 SYSMON -00040 Equipment off-line
2018-08-05 19:38:48    Equip = P17 SYSMON -00040 Equipment off-line
2018-08-05 19:38:54    Equip = P17 SYSMON -00040 Equipment off-line   902
2018-08-05 19:39:10    Equip = P17 SYSMON -00040 Equipment off-line
2018-08-05 19:39:20    Equip = P17 SYSMON -00040 Equipment off-line
2018-08-05 19:39:34    Equip = P17 SYSMON -00040 Equipment off-line
2018-08-05 19:40:00    TT2061 changing Topology [ Count=142 ]
2018-08-05 19:40:00    System[1]GBIC 17 indicated TX [ Count=171 ]   904
2018-08-05 19:40:09    Equip = P17 SYSMON -00040 Equipment off-line
2018-08-05 19:40:18    Equip = P17 SYSMON -00040 Equipment off-line
2018-08-05 19:40:27    Equip = P17 SYSMON -00040 Equipment off-line
2018-08-05 19:40:41    Equip = P17 SYSMON -00040 Equipment off-line
2018-08-05 19:41:00    Equip = P17 SYSMON -00040 Equipment off-line
2018-08-05 19:41:17    Equip = P17 SYSMON -00040 Equipment off-line
2018-08-05 19:41:35    Equip = P17 SYSMON -00040 Equipment off-line
2018-08-05 19:42:24    Equip = P17 SYSMON -00040 Equipment off-line
2018-08-05 19:42:35    Equip = P17 SYSMON -00040 Equipment off-line
2018-08-06 11:50:00    TT2061 changing Topology [ Count=10 ]
2018-08-06 11:50:00    System[1]GBIC 17 indicated TX [ Count=18 ]
2018-08-06 11:54:28    Equip = P17 SYSMON -00040 Equipment off-line
2018-08-06 11:55:00    TT2061 changing Topology [ Count=92 ]
2018-08-06 11:55:00    System[1]GBIC 17 indicated TX [ Count=120 ]
2018-08-06 11:55:33    Equip = P17 SYSMON -00040 Equipment off-line
2018-08-06 11:55:41    Equip = P17 SYSMON -00040 Equipment off-line
2018-08-06 11:55:49    Equip = P17 SYSMON -00040 Equipment off-line
2018-08-06 11:56:06    Equip = P17 SYSMON -00040 Equipment off-line
2018-08-06 11:56:24    Equip = P17 SYSMON -00040 Equipment off-line
2018-08-06 11:56:49    Equip = P17 SYSMON -00040 Equipment off-line
2018-08-06 11:57:04    Equip = P17 SYSMON -00040 Equipment off-line
```

FIG. 9

SYSTEMS AND METHODS FOR DETECTING AND PREDICTING FAULTS IN AN INDUSTRIAL PROCESS AUTOMATION SYSTEM

CROSS-REFERENCE TO RELATED APPLICATIONS

This application for patent claims the benefit of priority to and incorporates herein by reference U.S. Provisional Application No. 62/823,377, entitled "Systems and Methods for Detecting and Predicting Faults in an Industrial Process Automation System," filed Mar. 25, 2019; U.S. Provisional Application No. 62/823,469, entitled "Systems and Methods for Performing Industrial Plant Diagnostics and Operations," filed Mar. 25, 2019; and U.S. Provisional Application No. 62/842,929, entitled "Systems and Methods for Performing Industrial Plant Diagnostics," filed May 3, 2019.

TECHNICAL FIELD

Aspects of the present disclosure generally relate to industrial process automation and control systems. More particularly, aspects of the present disclosure relate to systems and methods for detecting and predicting faults in an industrial process automation system.

BACKGROUND

A typical industrial plant uses many interrelated and interconnected process automation systems to control and operate plant processes. Each system typically generates data in the form of log files that are specific to the operation of that system. The log files provide a record of events, including date and time of occurrence, that have transpired within the system as well as messages and communications among different components of the system. Such log files allow personnel to monitor the various systems for faults, track down the root causes of any faults, and take appropriate corrective actions.

Modern process automation systems generate data and error messages at an extremely high rate that results in a large volume of data being produced in a short amount time. The sheer volume of data can often overwhelm plant personnel and who are trying to monitor and interpret the data. In addition, each system generates data in a system-specific format that often differs from other systems, making interpretation of the data and error messages difficult. Moreover, the data and error messages generated by each system tend to be highly technical, requiring plant personnel to have expertise in that specific system. As a further complication, each system maintains the data and error messages in a separate location that is often not easily discernible.

Accordingly, improvements are needed in the field of industrial process automation and particularly in monitoring and maintaining a health of industrial process automation systems.

SUMMARY

Embodiments of the present disclosure provide systems and methods for detecting and predicting faults in an industrial process automation system. The embodiments are particularly useful in industrial process automation systems that employ distributed control systems. In some embodiments, the systems and methods use trend data to forecast alerts and allow action to be taken before a problem occurs. The systems and methods provide fault/failure predictions that improve over time as more empirical data is collected for a related set of system components. The systems and methods may identify inter-relationships among the components of a process automation system; identify and collect changes to system configuration; identify and collect data to inform reliability and predictive models; develop a domain-specific predictive model for one or more components that allows for component-based failure or degradation prediction; develop a system-predictive model that leverages the reliability and criticality relationships, component-based predictions and operating parameters to predict the health of a part of or the entire process automation system; deliver a prioritized alert system; identify root-cause failures of a component.

A fault associated with a first one or more devices may be brought to the attention of a user by displaying faults associated with other devices in the systems. In some embodiments, the systems and methods herein for detecting faults in industrial process automation systems may determine and display the root cause of the displayed faults (i.e., display an indication that faults associated with the first one or more devices are the root cause for the faults associated with other devices). In some embodiments, the systems and methods may track the resolution of past and/or current system-health problems to validate the efficacy of proposed future solutions.

In some embodiments, the systems and methods herein for detecting faults in process automation systems may encode and automate subject-matter expertise in diagnosing and predicting system issues. This may reduce the need for dedicated subject matter experts and improve the speed of the analysis and response. In some embodiments, the systems and methods herein may put individual alerts in context based on reliability, system interactions, and criticality. The systems and methods may automate root-cause-failure detection and additionally identify root-cause failures that originate in another component of the system or in a configuration change. In some embodiments, the systems and methods may map one or more log messages and/or alerts, system data, context or relationships into a human-readable text excerpt.

In some embodiments, the systems and methods herein for detecting faults in process automation systems may generate custom system-reliability and alerting models for one or more process automation system component; integrate the system-reliability and alerting model based on relationships between components; perform trend-based alerting; perform resolution-efficacy prediction based on historical actions and system impact; and perform root cause identification at a system level.

In some embodiments, the systems and methods herein for detecting faults in process automation systems may use a structural view of the process automation system and its components to identify one or more critical components and connections and generate a database of relationships; build a reliability/alerting model for one or more components and connections based on subject-matter expertise; identify and capture relevant data for one or more component; tune the model to the specific characteristics of the component/system; identify operations and trend data of one or more component; detect when one or more entities have an abnormal condition or predicted abnormal condition; evaluate an abnormal condition's root cause (e.g., the entity itself, another related entity, or configuration change) and evaluate the impact of the condition on the system; convert the identified condition into human-readable text excerpts; and log one or more corrective actions and correlate them with previous alerts, patterns, and corrective actions to predict efficacy of the one or more action.

In general, in one aspect, embodiments of the present disclosure relate to a monitoring system for an industrial plant. The monitoring system comprises, among other things, one or more processors and a storage unit communicatively coupled to the one or more processors. The storage unit stores processor-executable instructions that, when executed by the one or more processors, cause the monitoring system to run a process that inputs data files for the industrial plant, the data files containing data relating to nodes in the industrial plant, the data in each data file being in a different data format. The processor-executable instructions also cause the monitoring system to run a process that extracts the data from the data files, the data being extracted including timestamp, device name, device health, and message content, and run a process that converts the timestamp, device name, device health, and message content from the data files into a homogeneous format. The processor-executable instructions also cause the monitoring system to run a process that extracts features from the converted timestamp, device name, device health, and message content using machine learning to recognize the features, and run a process that identifies a node in the industrial plant that is experiencing an alarm using machine learning to recognize the node experiencing the alarm, the alarm indicating the node has failed or will fail within a specified amount of time.

In accordance with any one or more of the foregoing embodiments, the processor-executable instructions further cause the monitoring system to run a process that builds a network topology for the nodes in the industrial plant, the network topology establishing a hierarchy for the nodes in the industrial plant. In accordance with any one or more of the foregoing embodiments, the processor-executable instructions further cause the monitoring system to run a process that identifies a root cause for the alarm using machine learning to recognize the root cause, run a process that estimates a probability for the root cause using machine learning calculate the probability, run a process that displays a time-to-failure for the alarm based on the probability for the root cause, and/or run a process that graphically displays a severity level of the alarm based on time-to-failure for the alarm and/or impact of the alarm on plant operations. In accordance with any one or more of the foregoing embodiments, the processor-executable instructions further cause the monitoring system to run a process that graphically displays all data within a specified time period for the node in the industrial plant that is experiencing an alarm, and/or run a process that graphically displays all nodes in the industrial plant that are experiencing an alarm using machine learning to recognize the nodes. In accordance with any one or more of the foregoing embodiments, the processor-executable instructions further cause the monitoring system to run a process that identifies a corrective action for the alarm from captured knowledge using machine learning to extract the corrective action, the captured knowledge including maintenance logs for the industrial plant. In accordance with any one or more of the foregoing embodiments, the processor-executable instructions further cause the monitoring system to extract features by running a process that applies feature extraction rules to the converted timestamp, device name, device health, and message content using machine learning.

In general, in another aspect, embodiments of the present disclosure relate to a method for monitoring an industrial plant. The method comprises, among other things, inputting data files for the industrial plant, the data files containing data relating to nodes in the industrial plant, the data in each data file being in a different data format, and extracting the data from the data files, the data being extracted including timestamp, device name, device health, and message content. The method also comprises converting the timestamp, device name, device health, and message content from the data files into a homogeneous format, and extracting features from the converted timestamp, device name, device health, and message content using machine learning to recognize the features. The method further comprises identifying a node in the industrial plant that is experiencing an alarm using machine learning to recognize the node experiencing the alarm, the alarm indicating the node has failed or will fail within a specified amount of time.

In accordance with any one or more of the foregoing embodiments, the method further comprises building a network topology for the nodes in the industrial plant, the network topology establishing a hierarchy for the nodes in the industrial plant. In accordance with any one or more of the foregoing embodiments, the method further comprises identifying a root cause for the alarm using machine learning to recognize the root cause. In accordance with any one or more of the foregoing embodiments, the method further comprises estimating a probability for the root cause using machine learning calculate the probability, displaying a time-to-failure for the alarm based on the probability for the root cause, and/or graphically displaying a severity level of the alarm based on time-to-failure for the alarm and/or impact of the alarm on plant operations. In accordance with any one or more of the foregoing embodiments, the method further comprises graphically displaying all data within a specified time period for the node in the industrial plant that is experiencing an alarm, and/or graphically displaying all nodes in the industrial plant that are experiencing an alarm using machine learning to recognize the nodes. In accordance with any one or more of the foregoing embodiments, the method further comprises identifying a corrective action for the alarm from captured knowledge using machine learning to extract the corrective action, the captured knowledge including maintenance logs for the industrial plant, and/or applying feature extraction rules to the converted timestamp, device name, device health, and message content using machine learning.

In general, in yet another aspect, embodiments of the present disclosure relate to a computer-readable medium storing computer-readable instruction for causing one or more processors to perform a method according to any one more of the foregoing embodiments.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

FIG. 7 illustrates an aggregated alarm screen for an HMI of an exemplary industrial plant monitor according to embodiments of the present disclosure;

FIG. 9 illustrates an aggregated log messages screen for an HMI of an exemplary industrial plant monitor according to embodiments of the present disclosure.

Identical reference numerals have been used, where possible, to designate identical elements that are common to the figures. However, elements disclosed in one embodiment may be beneficially utilized on other embodiments without specific recitation.

DETAILED DESCRIPTION

This description and the accompanying drawings illustrate exemplary embodiments of the present disclosure and should not be taken as limiting, with the claims defining the scope of the present disclosure, including equivalents. Various mechanical, compositional, structural, electrical, and operational changes may be made without departing from the scope of this description and the claims, including equivalents. In some instances, well-known structures and techniques have not been shown or described in detail so as not to obscure the disclosure. Furthermore, elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

Figure 1:
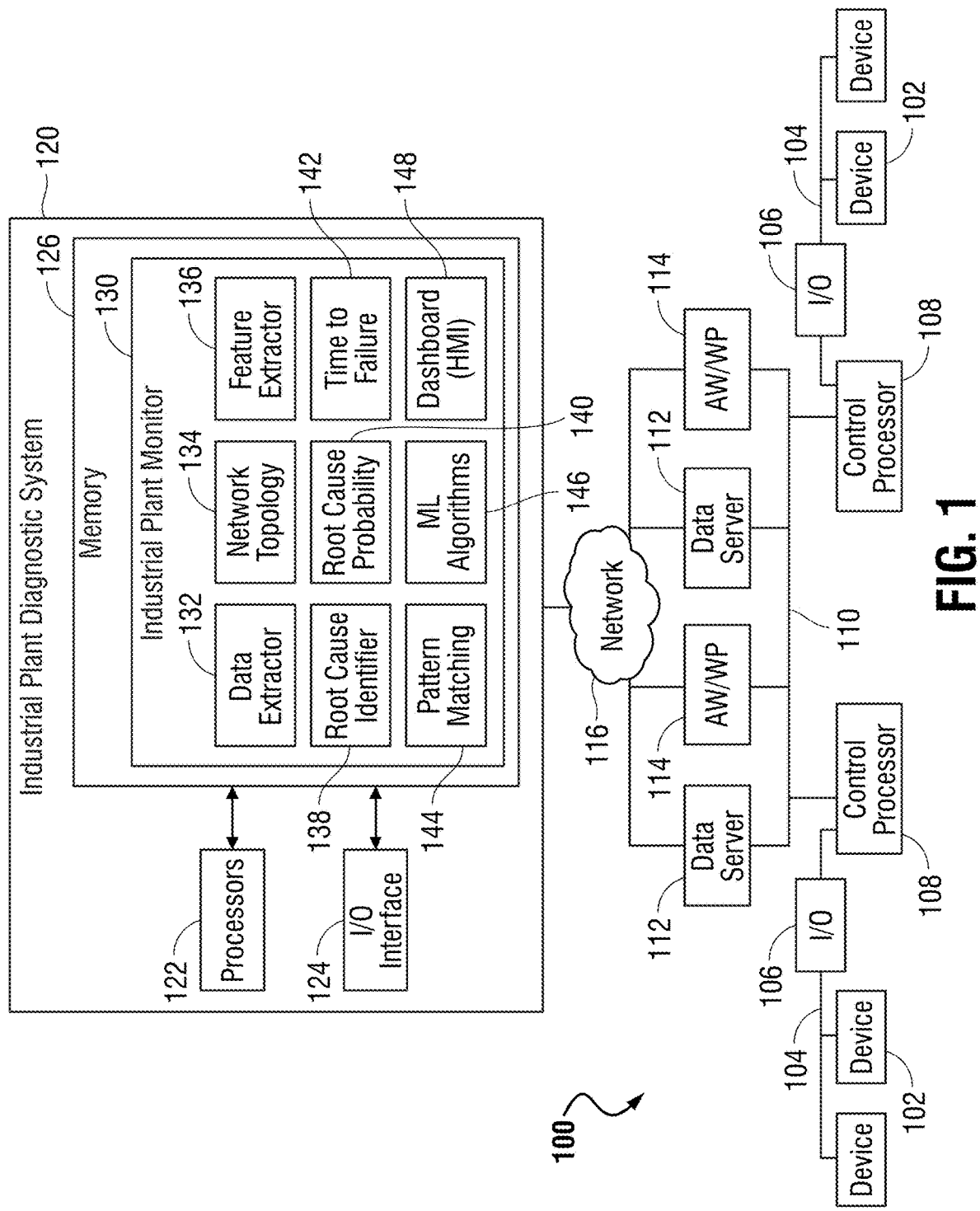
FIG. 1 illustrates an exemplary industrial plant monitoring system according to embodiments of the present disclosure.

Referring now to FIG. 1, an industrial process automation system 100 is shown for performing an industrial process, such as an oil refinery process, a chemical treatment process, a manufacturing process, and the like. The particular industrial process automation system 100 depicted here is commonly referred to as a distributed control systems (DCS). The DCS 100 typically includes a plurality of field devices, one of which is indicated at 102, that perform some subprocess within the industrial process. These field devices 102 may include, for example, sensors, actuators, motors, valves, and the like. Several field devices 102 are connected to a device bus, one of which is indicated at 104, that allow messages to be sent to and from the devices 102. Each device bus 104 is connected to an I/O module, one of which is indicated at 106, that links the devices 102 to a control processor 108. The I/O modules 106 are responsible for regulating messages to and from the devices 102 and may be, for example, fieldbus modules (FBM). The control processors 108 operate essentially autonomously to control operation of the devices 102 and may be, for example, programmable logic controllers (PLC), remote terminal units (RTU), programmable automation controllers (PAC), and the like. A control network 110 allows the control processors 108 to communicate with one another and with other systems on the network 110. The control network 110 may be implemented using Ethernet switches, gigabit interface converters (GBIC), optical fibers, cables, and the like, and/or may be wireless.

Also connected to the network 110 are one or more data servers 112 and one or more application workstations/workstation processors (AW/WP) 114, among other components. The application workstations/workstation processors 114 allow plant personnel to manually perform various tasks with respect to the industrial process, such as run tests, configure hardware, install software, modify process parameters, and the like, typically through a graphical user interface. The data servers 112 automatically provide data to the control processors 108 for carrying out the industrial process (or portions thereof) and also automatically acquire data from the control processors 108 for monitoring the industrial process. Some of the data acquired by the data servers 112 may include events, including date and time of occurrence, that have transpired at the control processors 108 as well as messages and communications sent and received by the control processors 108. These events and messages are typically acquired by process monitoring applications running on the data servers 112 that usually log the data in log files and system health data.

The log files and system health data may then be transmitted by the data servers 112 over an industrial network 116 to an industrial plant diagnostic system 120 that supervises the overall industrial process. The industrial plant diagnostic system 120 provides, among other things, high-level monitoring of individual process controllers 108 that allows plant personnel to oversee the industrial process and coordinate operation of the various process controllers 108. In the example shown, the exemplary industrial plant diagnostic system 120 has a typical system architecture that includes one or more processors 122, an internal input and/or output ("I/O") interface 124, and a memory 126, all communicatively coupled and/or electrically connected to each other. Operation of these components of the system 120 is generally well known in the art and thus only briefly mentioned here.

In general, the one or more processors 122 are adapted to execute processor-executable instructions stored in the memory 126. The I/O interface 124 allows the processors 122 to interact and communicate with external systems (and users). The communication may be accomplished over one or more communication networks, such as the industrial network 110, a wide area network (WAN), a local area network (LAN), and the like. The memory 126 is adapted to provide processor-executable instructions to the processors 122 upon request thereby. Other computing components known to those skilled in the art may also be included in the industrial plant diagnostic system 120 within the scope of the present disclosure.

As alluded to above, the data servers 112, or rather the process monitoring applications running thereon, can generate log files and system health data at an extremely high rate, resulting in large volumes of data in a short amount time. In addition, the data generated can be highly technical and system-specific, requiring plant personnel to have expertise in that specific system. Examples of process monitoring applications that can run on the data servers 112 include SMON (System Monitor), Wireshark, Multicast, Netsight, Syslog, System Auditor, as well as data historian and archiving applications, counters from local watch databases, application workstation space reports, control processor load reports, CRC (cyclic redundancy check) and other error checking applications, and system and network traps and interrupt routines known to those skilled in the art. The sheer volume of data and the highly technical nature of the data can often overwhelm plant personnel who need to use the data to detect faults in the DCS 100 and determine root causes therefor.

Thus, in accordance with embodiments of the present disclosure, the memory 126 stores an industrial plant monitor 130 that can automatically process the data generated by the data servers 112 to detect and predict faults in the DCS 100 (and similar industrial process automation systems). Among other things, the industrial plant monitor 130 can automatically aggregate log files and system health data from the various data servers 112 and analyze the effects and interactions among different components to identify probable component failures, estimate time until failure, raise alarms for the failures, and determine likely root cause of the failures. The industrial plant monitor 130 can also present the data in an intuitive, context-based format that allows plant personnel to quickly assess potential fault conditions, the criticality thereof, root causes therefor, and determine possible corrective actions. In short, the industrial plant monitor 130 can provide a system-level health monitor for the entire DCS 100 and not simply for individual devices therein.

In some embodiments, the industrial plant monitor 130 includes a number of functional modules that work together to provide the system-level health monitoring mentioned above. These functional modules may include, for example, a data extractor 132, a network topology builder 134, a feature extractor 136, a root cause identifier 138, a root cause probability estimator 140, a time to failure estimator 142, a pattern matching module 144, one or more ML algorithms 146, and an HMI application 148. Although the functional modules are shown here as discrete blocks, those skilled in the art will understand that two or more blocks may be combined into a single block, and any single block may be divided into several constituent blocks, without departing from the scope of the present disclosure. A more detailed description of the operation of the industrial plant monitor 130 follows later herein.

Figure 2:
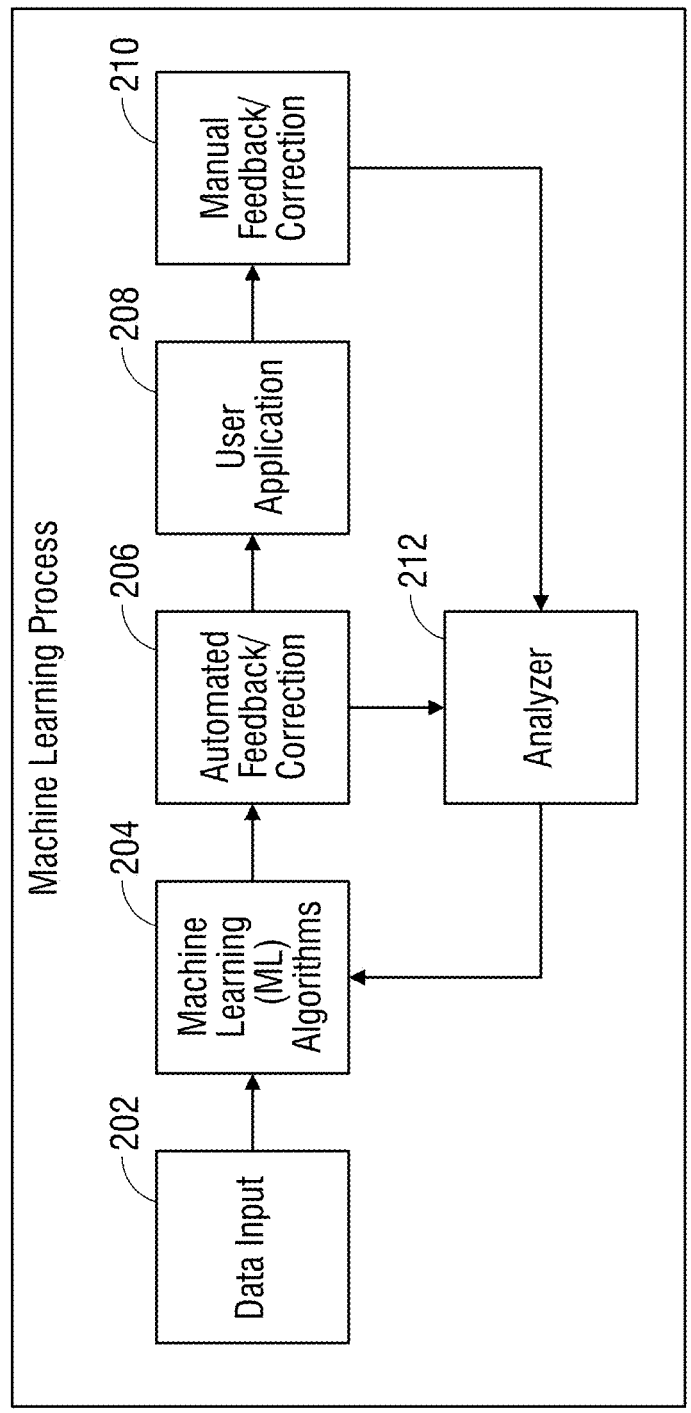
FIG. 2 illustrates exemplary machine learning process that may be used with embodiments of the present disclosure.

Referring next to FIG. 2, an exemplary machine learning process 200 is shown that may be used with the industrial plant monitor 130 in some embodiments. The machine learning process 200 may be applied by any of the functional modules 132-144 that require some form of machine learning to analyze the log files and system health data from the various data servers 112. In the example shown, the machine learning process 200 includes a data input component 202, one or more machine learning models or algorithms 204, an automated feedback/correction component 206, a user application 208, a manual feedback/correction component 210, and an analyzer 212. Examples of algorithms that may be used with the machine learning process 200 include Long Short-Term Memory (LSTM), Random Forest, Decision Tree, Natural Language Processing, and the like.

In general operation, the data input component 202 receives data (e.g., log files, system health data, etc.) and, after appropriate pre-processing, feeds the data to the one or more machine learning models 204. The machine learning models 204 use machine learning and neural network processing techniques to extract relevant features from the data (e.g., events, dating time of occurrence, error messages, etc.). The automated feedback/correction component 206 applies rules and algorithms configured to detect errors in the output received from machine learning models 204. These errors are used to auto-correct the model output and are fed back to the machine learning models 204 via the analyzer 212 to update the processing of the machine learning models 204. The processed output from automated feedback/correction component 206 is then displayed to a user for validation via the user application 208. The corrections made by the user are captured by the manual feedback/correction component 210 and fed back into the machine learning models 204 via the analyzer 212. This allows the machine learning models 204 to continuously improve evaluation and extraction of relevant features from the input data.

Figure 3:
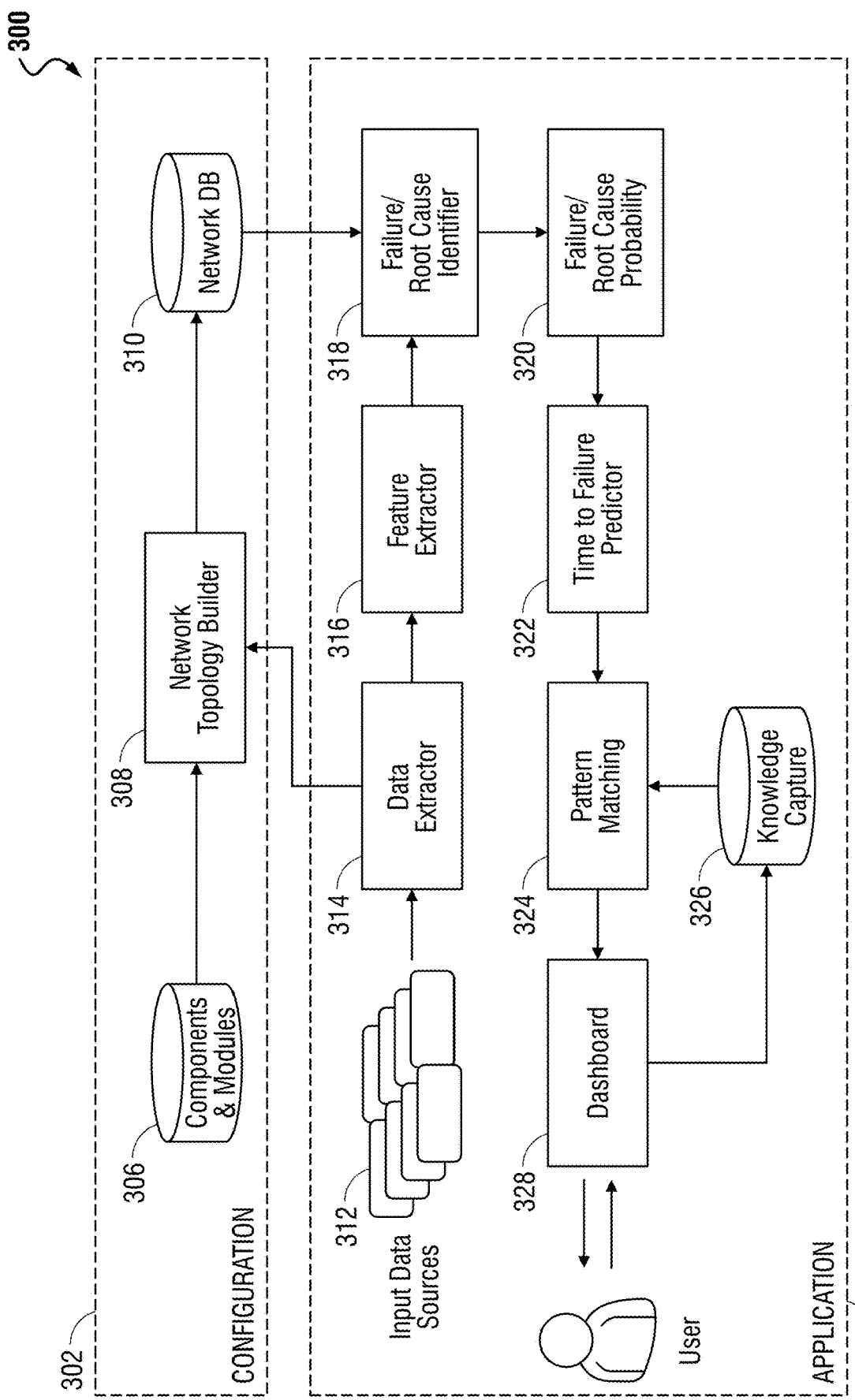
FIG. 3 illustrates an exemplary method of monitoring an industrial plant according to embodiments of the present disclosure.

FIG. 3 is a flow chart 300 illustrating exemplary operation of the industrial plant monitor 130 according to embodiments of the present disclosure. The flow chart 300 has two main stages, a configuration stage 302 and an application stage 304. In the configuration stage 302, the industrial plant monitor 130 builds a network topology for the DCS 100 and performs other software and hardware configurations tasks. In the application stage 304, the industrial plant monitor 130 performs analysis of log files and system health data and system health data to detect faults, predict time-to-fail for failures, and identify root causes. The industrial plant monitor 130 performs the two stages 302 and 304 on an on-going basis as needed so they run essentially in parallel with one another.

In the configuration stage 302, output from a network discovery application is obtained for the DCS 100 and stored in a components and modules inventory database 306. Any suitable network discovery application that can search through a network like the DCS 100 and discover network nodes, connectivity, routing protocols, and the like may be used to provide the information stored in the components and modules inventory database 306. The industrial plant monitor 130 then uses the inventory to build a network topology for the DCS 100 at block 308. In some embodiments, building a network topology involves aggregating all the nodes in the DCS 100 and positioning the nodes in a hierarchy based on their relationship to one another and their connectivity to one another. This information can include information that uniquely identifies each node, such as the IP address, MAC address, letterbug (e.g., alphanumeric identifier), and the like for each node, as well as numbers for any hardware, software, and firmware for each node and the network routing protocols used by each node. Information related to primary and secondary or backup devices may also be collected in case of fault tolerant devices. The industrial plant monitor 130 may then use the information to build a network topology that details how the nodes are interconnected and how data is transferred among the nodes in the network.

Figure 4:
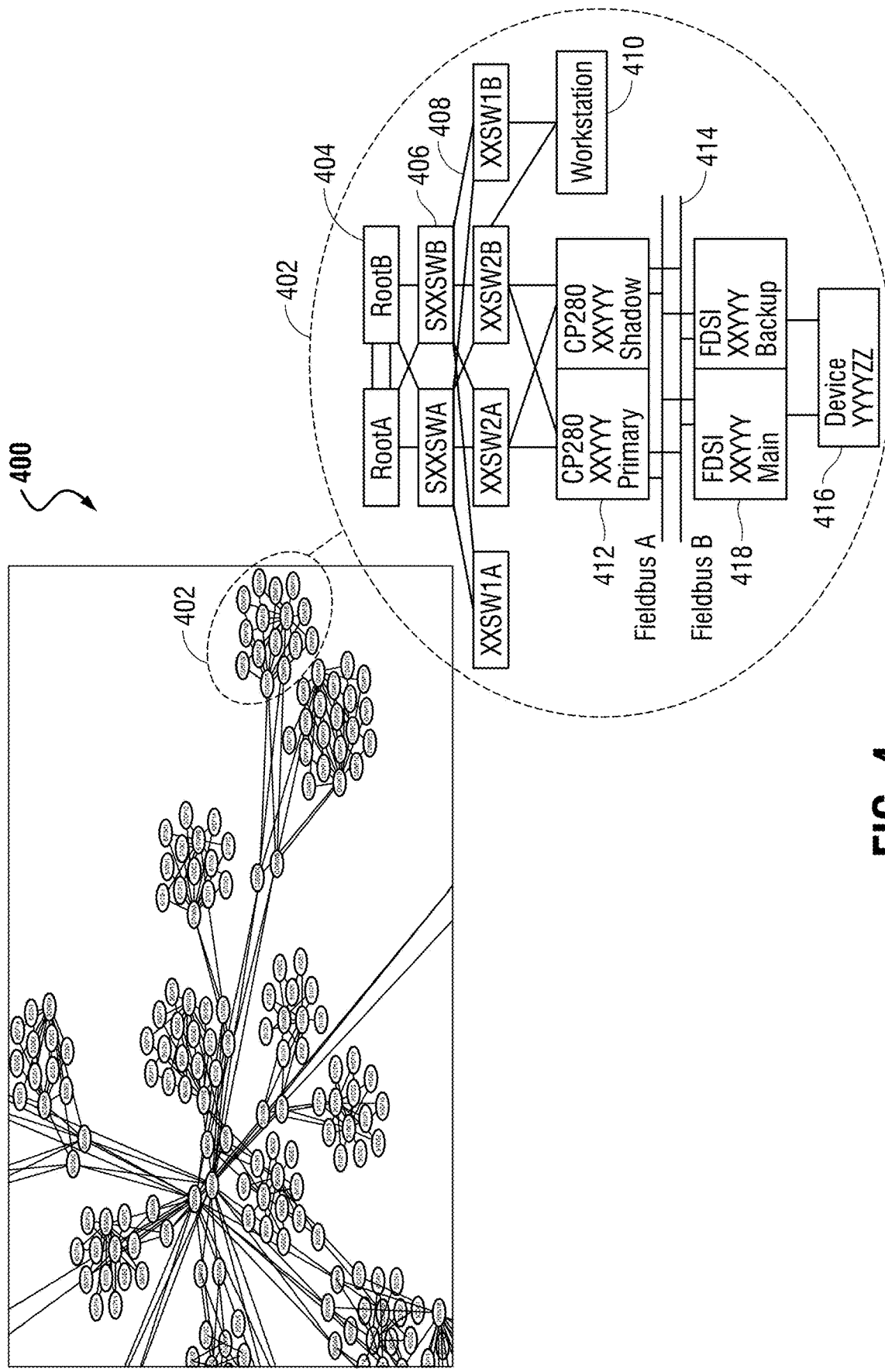
FIG. 4 illustrates an exemplary network topology according to embodiments of the present disclosure.

FIG. 4 shows an example of a network topology 400 for the DCS 100 that is built by the industrial plant monitor 130 from the ferret output in the configuration stage 302. The network topology 400 in this example includes a number of branches 402 that connect to one another to form the overall network topology 400. Each branch includes one or more root devices 404 (e.g., root bridges) and one or more switches 406 connected together over a mesh network 408. One or more workstations 410 are connected to one or more of the switches 406 over the mesh network 408, as are one or more control processors 412. Where a backup or shadow control processor is provided, the shadow control processor may also be connected to one or more of the switches 406 over a mesh network 408. The one or more control processors 412 are in turn connected to one or more fieldbuses 414 that link the one or more control processors 412 to one or more field devices 416 via one or more fieldbus modules 418 (FBM), such as a field device system integrator module (FDSI). Such a network topology 400 can then be stored in a network database 310 for subsequent use in the application stage 306 to detect faults, predict time-to-fail for failures, and determine root causes.

The application stage 306 (FIG. 3) generally begins with input of data sources into the industrial process monitor 130 at block 312. The data sources may include the log files and system health data generated by the process monitoring applications (e.g., SMON, Wireshark, Syslog, System Auditor, CRC, etc.) running on the data servers mentioned earlier as well as other time series data. At block 314, the industrial process monitor 130 extracts relevant data from the various data sources. This data extraction may involve reading the time series data from the various data sources and loading the data into memory, then converting the data from the various sources into a homogenous format. An exemplary homogenous format may include a timestamp field, a data source field, a field for the device generating the data, a field for the message related to the data, a field for the name of the device that is the subject of the message, and the like. The extracted data may then be used to dynamically update the network topology with any devices identified from the data that are not already included in the network topology.

At block 316, the industrial process monitor 130 extracts relevant features from the extracted data for use with the machine learning process 200 (FIG. 2) mentioned earlier. This feature extraction may involve applying various rules to the extracted data to identify relevant features from the data. The data may then be resampled at regular intervals (e.g., 10 minutes, 20 minutes, 30 minutes, etc.) and relevant features extracted again from the data. Examples of rules that may be applied to the extracted data are shown in Table 1 below.

TABLE 1

Feature Extractor Rules

| Exemplary Rule Name | Exemplary Description | Exemplary Log Message |
| --- | --- | --- |
| BUS access error | Rule to check whether the FBM and control processor has any bus error. | 01CP21 Single PIO Bus Access Error on B |
| A-to-D fault | Rule to check whether the FBM has A2D fault. | Process = 012106 17D6 −39 55 A-to-D fault detected<br>Process = 012106 17D6 −39 26 Group sample time overrun/recover<br>Process = 012106 17D6 −39 25 GIRUN stuck, recovering<br>Process = 012106 17D6 −39 21 A-to-D Reinitialized-Lockup |
| Control processor reboot/fail | Rule to check whether the control processor has rebooted (i.e., when a Single message is followed by Married) or failed (i.e., when only a Single message is present) | Fault Tolerant Primary Module Now Single. ROM Address 00006C22EEB6 Fault Tolerant Shadow Module Now Single. ROM Address 00006C22EEB6 Fault Tolerant Modules Now Married |
| Module reset | Rule to check whether a module went offline due to a reset. | Process = WDT_TASK FTFCPS 000038 Module Went OFF Line due to RESET. ROM Address 00006C22EED0 |
| Comm device failed | Communication device failed | 01CP21 Equip SYSMON Comm Device Failed |
| Check point created | Rule to check whether a configuration check point occurred in the control processor | Software Manager SYSMON-00021 Checkpoint Successful |
| ReadLM error | The ReadLM error indicates a mesh communication port is unstable, this can be temporary or persistent | Readlm SYSMON-00215 PORT A is failed |
| GBIC error | Rule to check whether the switch has a GBIC issue from the Syslog data sources | System [1] GBIC 17 indicated transmission |
| Topology change | Rule to check whether the switch changed topology in the TRAP data source | SNMP v1, community public dot1dBridge Enterprise Specific Trap (topology change) Uptime: 25 days, 21:42:33 |
| Address resolution protocol (ARP) | Rule to check whether the switch, control processor, workstation, etc., is being searched for by other switches, control processors, workstations, etc. (i.e., rule to track ARP messages). | 01AW41 searching for S01SWB |

The above rules may be applied to the data extracted (block 314) from the various data sources to identify relevant features for machine learning purposes. Exemplary types of features that may be extracted include the following: device type, ARP count per day, ARP search devices, total GBIC error count per day, intermittent GBIC error count per day, GBIC trending count, ReadLM error count, percentage of control processors showing errors, equipment failed, topology change count per day, intermittent topology count, bus error count per day, intermittent bus error, analog-to-digital error count, intermittent analog-to-digital error count, marry-remarried intermittent pattern, and the like.

At block 318, the industrial process monitor 130 identifies potential failures and root causes of the failures from the extracted features (e.g., using the machine learning process 200). This failure/root cause identification may involve training a machine learning model, such as Random Forest or Decision Tree, to identify root causes using historical log file data. Network topology information for the root cause identification is provided by the network database 310. In one example, 9 months of historical log file data from an industrial process automation system like the DCS 100 was used. From this data, 6 weeks of data was selected, out of which 4 weeks of data was used for training and 2 weeks of data was used for validating the training.

The training involved creating a matrix of features with actual data (e.g., messages) and labels for the features. The matrix had dimensions N×M, where N is the number of features and M is the number of feature extraction rules (e.g., Table 1). The feature labels were derived from plant maintenance logs and input from subject matter experts. Intermediate labels were created for logically related groups of features. Thus, features related to topology changes, increase in ARP patterns, ReadLM errors, and the like, were given an intermediate label of, for example, "Switch Hardware Issue." Similarly, features related to increases in topology change, GBIC errors, increases in ARP searches, and the like, were labeled, for example, "Switch GBIC Issue." Bus access errors were labeled, for example, "bus Access errors," and A-to-D faults were labeled, for example, "A-to-D Device Failed," while control processor remarry failures and module reset errors were labeled, for example, "Control Processor Hardware Error." Errors such as intermittent ReadLM errors and intermittent ARP messages were labeled, for example, "Dirty Fiber Between Switch and Control Processor," while intermittent ARP messages by all connected devices were labeled, for example, "Slow Response Time."

At block 320, the industrial process monitor 130 identifies probabilities for the failures/root causes from the identified failures/root causes (e.g., using the machine learning process 200). This probability identification may involve a similar process of training a machine learning model (e.g., Random Forest, Decision Tree, etc.) using historical log file data as described above with respect to block 318. In some embodiments, the devices associated with the identified root causes may also be provided as input for training the machine learning model.

At block 322, the industrial process monitors 132 predicts the time-to-failure based on the failure/root cause probabilities determined in block 318 (e.g., using the machine learning process 200). This time-to-failure prediction may involve assigning a predefined time interval to a given failure/root cause based on the probability of the given failure/root cause. The duration of the time-to-failure interval may be based, for example, on historical log files, system health data, and error data. For example, if the probability of a given failure is greater than 99%, the failure has already occurred and a time-to-failure of zero days may be assigned by the industrial process monitor 130. If the probability of a given failure is 90% or above, then the failure has already occurred or it is about to occur and may be assigned a time-to-failure of 24 hours.

If the probability of a given failure is greater than 30%, but less than 90%, then the industrial process monitor 130 may forecast that the features extracted for that failure will occur within 1 day (i.e., project or interpolate the data forward 1 day). The industrial process monitor 130 may then rerun the root cause and probability identifications with these features to see if the probability has reached 90%. If yes, then the time-to-failure of 1 day is retained for that failure. If no, then the industrial process monitor 130 adds another day to the time-to-failure and repeats the process until the probability has reached 90%. If the number of days added exceeds 5 days, then no time-to-failure is assigned.

In some embodiments, the industrial process monitor may use a Random Forest Regression (RFR) model to find the time-to-failure interval (whereas a Random Forest Classification (RFC) may be used to find the root cause). Building the RFR involves setting the actual day of failure (e.g., as reported by a field engineer) as the zeroth day of the failure in the training data, then looking at features in the data going back in time to the previous 5 days, for example. Table 2 shows an exemplary set of training data for an RFR model. The data is for a component issue that led to a problem in communication between a control processor and the field bus module. There are two trends that can be seen related to PIO bus access errors and the fault-tolerant MAC reset counts.

TABLE 2

Exemplary RFR Training Data

| PIO Bus access errors | Fault-tolerant MAC reset errors | Number of hours left |
|---|---|---|
| 214 | 595 | 0 |
| 162 | 400 | 24 |
| 162 | 200 | 48 |
| 100 | 95 | 72 |
| 35 | 22 | 96 |

At block 324, the industrial process monitor 130 performs pattern matching on data from a knowledge capture database 326 to determine if the same or similar failures/root causes have occurred previously and which corrective actions were taken to resolve the failures. The data stored in the knowledge capture database 326 typically include maintenance logs and records of actions taken previously by plant personnel to correct various errors in the DCS 100 over time. These maintenance logs and records, which may include text documents, spreadsheets, and the like, are typically maintained by the plant personnel using common words and phrases. As such, the industrial process monitor 130 uses natural language processing (NLP) via the machine learning process 200 to extract relevant information from the maintenance logs and records. The natural language processing allows the industrial process monitor 130 to quickly filter out extraneous words and phrases and focus in on key information. Thus, for example, if multiple different corrective actions A, B, and C were taken to address a particular failure because the immediately preceding action was not effective, the industrial process monitor 130 can home in straight to the final corrective action (action C) that fixed the failure.

At block 328, the industrial process monitor 130 provides the above analysis to plant personnel in the form of an HMI referred to herein as a dashboard. The dashboard is essentially a collection of screens that the industrial process monitor 130 can generate and display to a user that provides the user with data in an intuitive, context-based format that allows the user to quickly assess potential fault conditions, the criticality thereof, root causes thereof, and determine possible corrective actions. This dashboard graphically visualizes the contents of numerous (potentially millions) of log files and system health data that were aggregated and converted into usable, actionable information. From the HMI/dashboard, the user may be able to quickly see, for example, that a certain switch (e.g., switch TT2061) has an issue in a certain component (e.g., GBIC17) that is likely to cause the switch to fail soon (e.g., in the next five days).

Figure 5A:
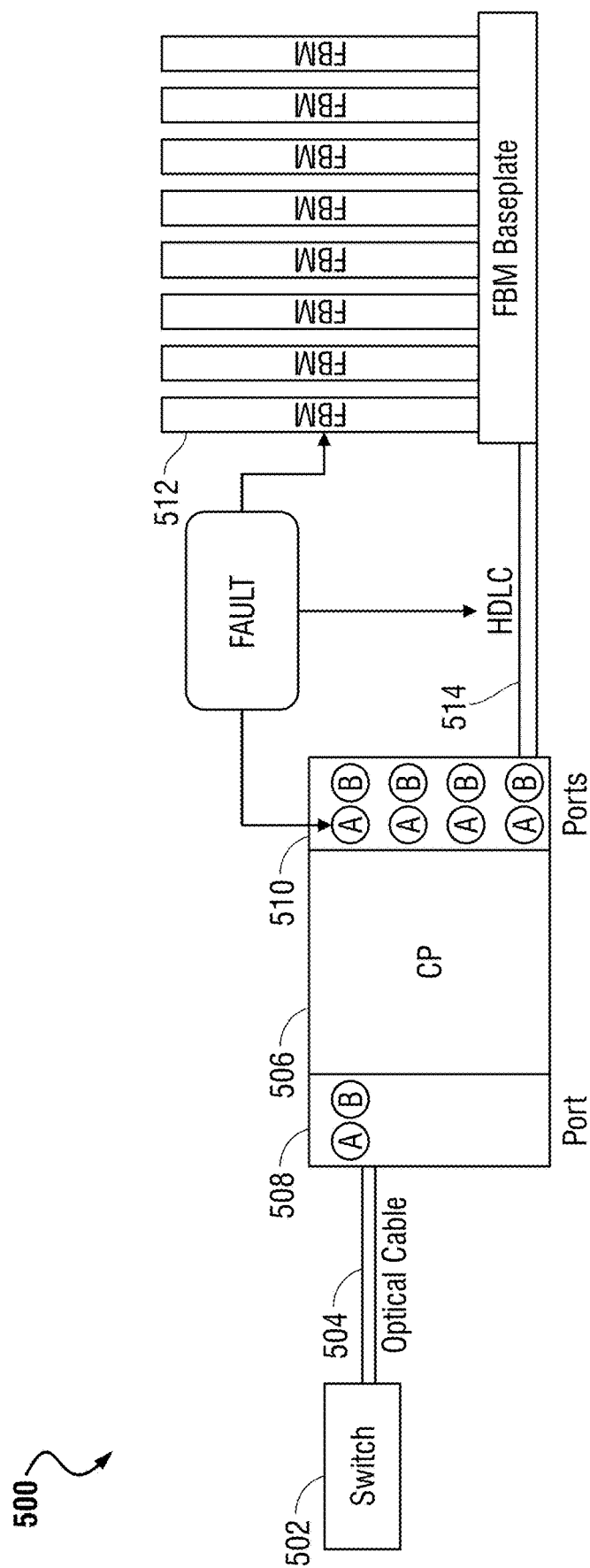
FIGS. 5A-5B illustrate exemplary failure analysis screens for an HMI of an exemplary industrial plant monitor according to embodiments of the present disclosure.
Figure 5B:
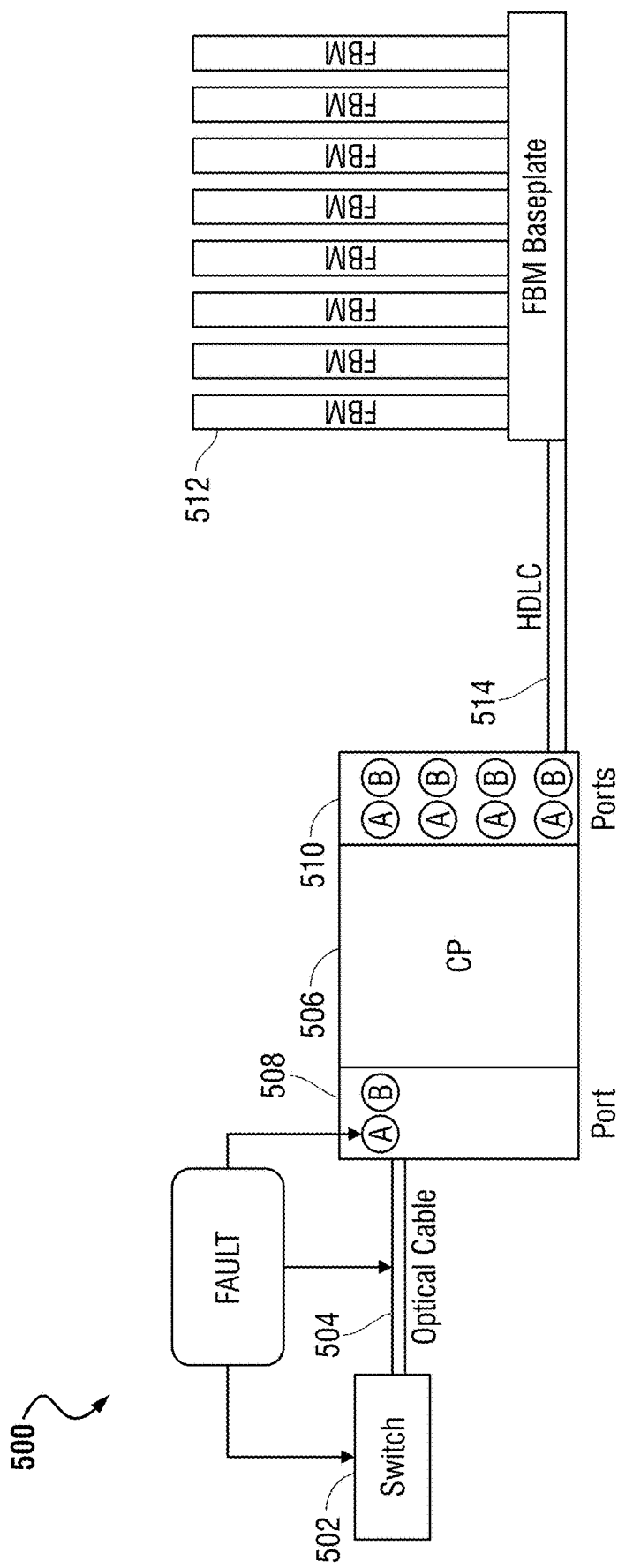

FIGS. 5A-5B show an exemplary failure analysis screen 500 for a dashboard of an exemplary industrial plant monitor. The screen 500 includes a switch 502 connected by an optical fiber 504 to a control processor 506 via one of several ports 508 thereof. The control processor 506 is in turn connected via one of several ports 510 to a fieldbus module 512 by a bus 514 (e.g., an HDLC). In the FIG. 5A example, the industrial plant monitor has determined that there is a fault condition between one of the ports 510 of the control processor 506 and the fieldbus module 512 based on log messages from the control processor 506. In addition, based on these log messages, the industrial plant monitor has determined that the fault condition is likely caused by the bus 514. In contrast, in the example of FIG. 5B, the industrial plant monitor has determined based on log messages from the control processor 506 and the switch 502 that the fault condition is likely caused by the optical cable 504.

Figure 6:
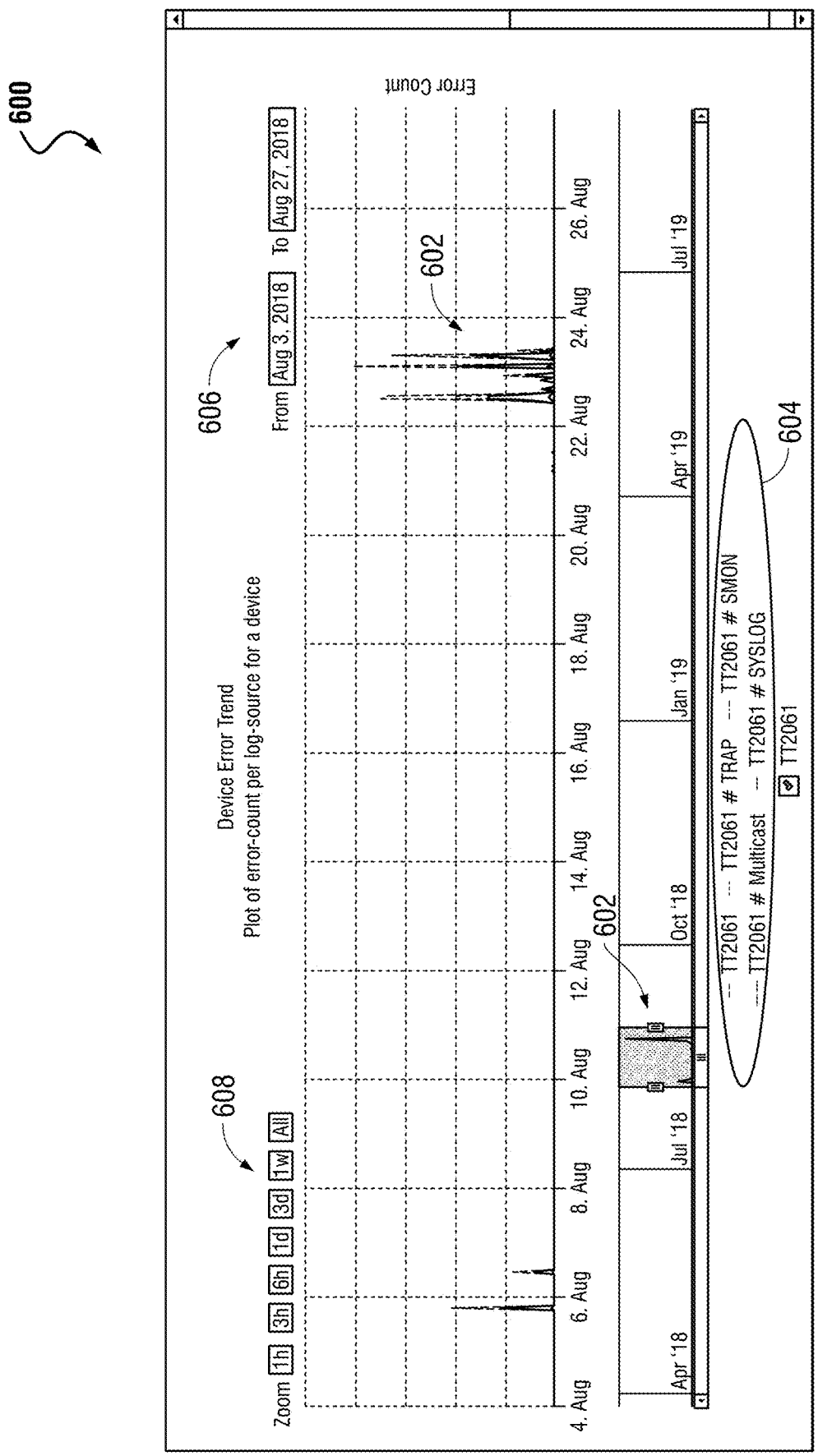
FIG. 6 illustrates a device error trend screen for an HMI of an exemplary industrial plant monitor according to embodiments of the present disclosure.

FIG. 6 shows an exemplary device error trend screen 600 of the dashboard that can be generated and displayed by the industrial plant monitor. The screen provides a device error trend, indicated at 602, that shows a plot of the error count for each log source associated with the device. The device in this example is TT2061 and the log sources from which data for the device is obtained are indicated at 808. In some embodiments, the log sources may be color-coded and/or symbol coded to differentiate among the different log sources. From this screen, a user can quickly see the time interval when the error count for the device began to increase, thereby alerting the user to a potential problem with the device over that time interval. Date and time information are provided at 604, and zoom options (e.g., 1-hour, 3-hour, 6-hour, 1-day, 3-days, 1-week, etc.) are provided at 606.

FIG. 7 shows an exemplary aggregated alarm screen 700 of the dashboard that can be generated and displayed by the industrial plant monitor. The main objective of this screen is to provide a list, indicated at 702, of all alarms and potential fault conditions in the DCS. In the embodiment shown, the list 702 includes the date, device name, a severity indicator, and a message field containing usable and actionable information for each alarm in the list. In the example, the message field contains a root cause identification for the alarm along with a probability estimation for the alarm. Based on the probability estimation (e.g., 39% for the first alarm), the industrial plant monitor predicts a time-to-failure (e.g., within three days) for the device in question. As such, the severity indicator may provide a severity of "high" for this device. In some embodiments, the severity indicator may be color-based (e.g., red for critical, yellow for high, orange for low, etc.), symbol-based (e.g., exclamation mark for critical, question mark for high, dashes for low, etc.), or a combination of both. Additional and/or alternative information may be included in some embodiments, such as date and time of the current analysis, indicated at 704. A search box 706 may be included in some embodiments to allow a user to search for alarms and fault conditions using natural language queries. Selecting (e.g., by tapping, double-clicking, etc.) one of the alarms in the list 702, such as the alarm for device 01CP21, takes the user to a detailed alarm screen for that alarm.

In some embodiments, the industrial plant monitor assigns a severity level (e.g., critical, high, low, etc.) to an alarm based on the impact the alarm will have on continuity of the plant and/or business operations. Alarms that have a more significant impact (e.g., potential process shutdown) are assigned a higher severity relative to alarms that have a less significant impact (e.g., decreased throughput). Thus, for example, a switch and a control processor may be assigned a device with higher criticality relative to an application workstation, FBMs, field devices, and the like. Similarly, an area controlled by a controlled processor may be assigned a high priority or a medium/low based on the function performed by the area of the processor and the impact on business operations. The severity assignments may be done manually by an operator during configuration of the system in some cases, and/or the severity assignment may be done by the system on an ongoing basis using machine learning algorithms trained on historical alarm training data. In either case, the ability to assign different severity levels to the various alarms allows the industrial plant monitor to provide operators with context for the alarms so that higher priority can be diverted to the processes/areas in the plant affected by critical devices.

Figure 8:
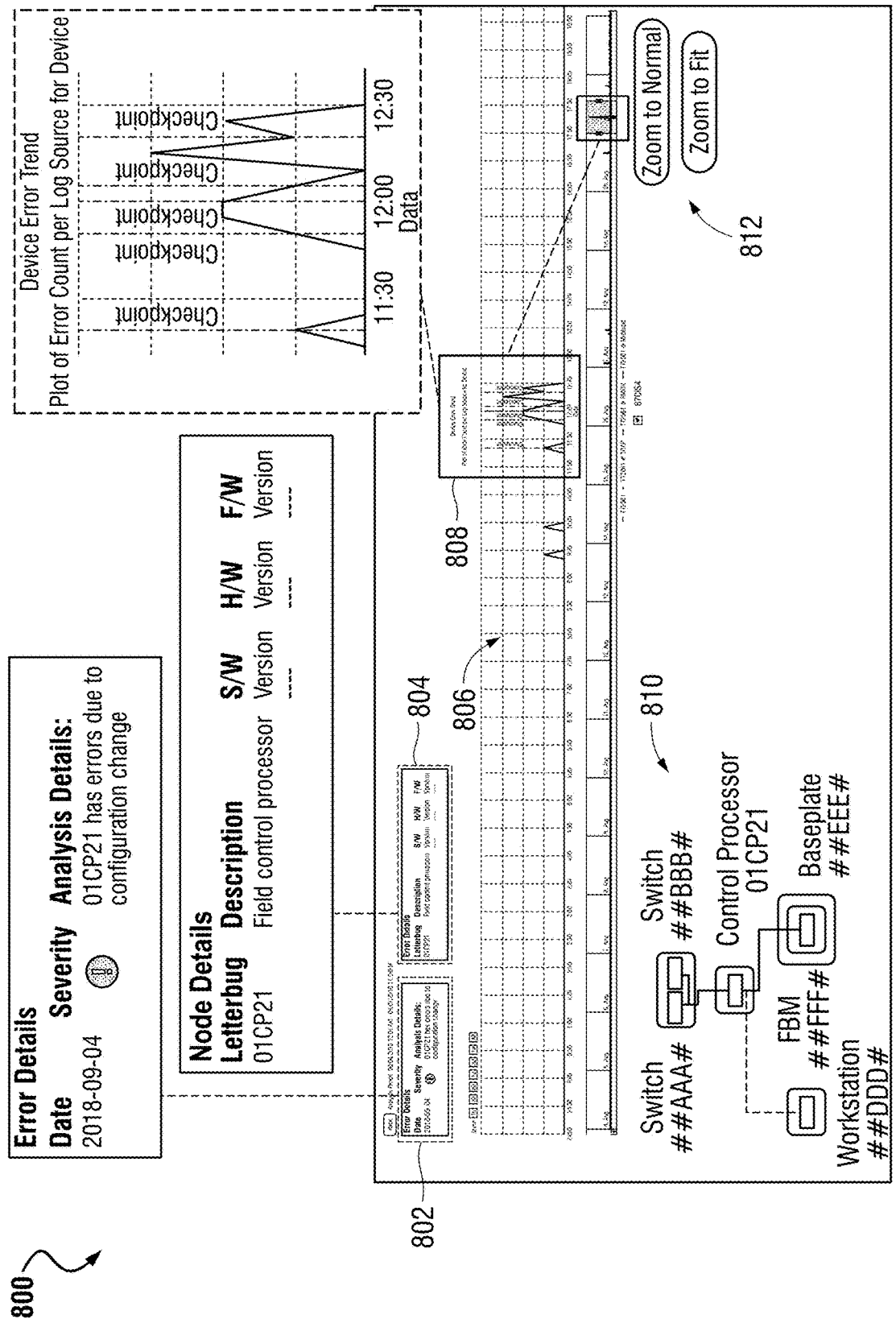
FIG. 8 illustrates a detailed alarm screen for an HMI of an exemplary industrial plant monitor according to embodiments of the present disclosure.

FIG. 8 shows an exemplary detailed alarm screen 800 of the dashboard that can be generated and displayed by the industrial plant monitor. This screen, as the name implies, displays detailed information about the selected alarm, including error details such as date, severity, analysis details, and so forth, indicated at 802, and device details such as device letterbug, device description, software/hardware/firmware versions, and so forth, indicated at 804. The screen may also provide a device error trend at 806 similar to the one in FIG. 7, that shows a plot of the error count 808 for each log source associated with the device. To provide context, the screen also shows the relevant network portion 810 of the network topology where the device is located so the user can see where the device resides within the DCS. In some embodiments, the screen also provides an option to zoom the network portion 810 in and out as desired.

FIG. 9 shows an aggregated log messages screen of the dashboard that can be generated and displayed by the industrial plant monitor. This screen aggregates log error messages and groups them according to log files and system health data and by time. Thus, the error messages indicated at 902 were obtained from one log file and the error messages indicated at 904 were obtained from a different log file, and so forth. The error messages may be color-coded for easy viewing in some embodiments. From this screen, the user can quickly see error messages for all devices in the DCS that are currently experiencing a fault condition.

Accordingly, as described herein, embodiments of the present disclosure provide systems and methods for detecting and predicting faults in an industrial process automation system. Such embodiments may comprise a special purpose computer including a variety of computer hardware, as described in greater detail below.

Embodiments within the scope of the present disclosure also include computer-readable media for carrying or having computer-executable instructions or data structures stored thereon. Such computer-readable media can be any available media that can be accessed by a special purpose computer and comprises computer storage media and communication media. By way of example, and not limitation, computer storage media include both volatile and nonvolatile, removable and non-removable media implemented in any method or technology for storage of information such as computer-readable instructions, data structures, program modules or other data. Computer storage media are non-transitory and include, but are not limited to, random access memory (RAM), read only memory (ROM), electrically erasable programmable ROM (EEPROM), compact disk ROM (CD-ROM), digital versatile disks (DVD), or other optical disk storage, solid state drives (SSDs), magnetic cassettes, magnetic tape, magnetic disk storage, or other magnetic storage devices, or any other medium that can be used to carry or store desired non-transitory information in the form of computer-executable instructions or data structures and that can be accessed by a computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general-purpose computer, special purpose computer, or special purpose processing device to perform a certain function or group of functions.

The following discussion is intended to provide a brief, general description of a suitable computing environment in which aspects of the disclosure may be implemented. Although not required, aspects of the disclosure will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that aspects of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing aspects of the disclosure includes a special purpose computing device in the form of a conventional computer, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory includes computer storage media, including nonvolatile and volatile memory types. A basic input/output system (BIOS), containing the basic routines that help transfer information between elements within the computer, such as during start-up, may be stored in ROM. Further, the computer may include any device (e.g., computer, laptop, tablet, PDA, cell phone, mobile phone, a smart television, and the like) that is capable of receiving or transmitting an IP address wirelessly to or from the internet.

The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The magnetic hard disk drive, magnetic disk drive, and optical disk drive are connected to the system bus by a hard disk drive interface, a magnetic disk drive-interface, and an optical drive interface, respectively. The drives and their associated computer-readable media provide nonvolatile storage of computer-executable instructions, data structures, program modules, and other data for the computer. Although the exemplary environment described herein employs a magnetic hard disk, a removable magnetic disk, and a removable optical disk, other types of computer readable media for storing data can be used, including magnetic cassettes, flash memory cards, digital video disks, Bernoulli cartridges, RAMs, ROMs, SSDs, and the like.

Communication media typically embody computer readable instructions, data structures, program modules or other data in a modulated data signal such as a carrier wave or other transport mechanism and includes any information delivery media.

Program code means comprising one or more program modules may be stored on the hard disk, magnetic disk, optical disk, ROM, and/or RAM, including an operating system, one or more application programs, other program modules, and program data. A user may enter commands and information into the computer through a keyboard, pointing device, or other input device, such as a microphone, joy stick, game pad, satellite dish, scanner, or the like. These and other input devices are often connected to the processing unit through a serial port interface coupled to the system bus. Alternatively, the input devices may be connected by other interfaces, such as a parallel port, a game port, or a universal serial bus (USB). A monitor or another display device is also connected to the system bus via an interface, such as a video adapter. In addition to the monitor, personal computers typically include other peripheral output devices (not shown), such as speakers and printers.

One or more aspects of the disclosure may be embodied in computer-executable instructions (i.e., software), routines, or functions stored in system memory or nonvolatile memory as application programs, program modules, and/or program data. The software may alternatively be stored remotely, such as on a remote computer with remote application programs. Generally, program modules include routines, programs, objects, components, data structures, etc. that perform particular tasks or implement particular abstract data types when executed by a processor in a computer or other device. The computer executable instructions may be stored on one or more tangible, non-transitory computer readable media (e.g., hard disk, optical disk, removable storage media, solid state memory, RAM, etc.) and executed by one or more processors or other devices. As will be appreciated by one of skill in the art, the functionality of the program modules may be combined or distributed as desired in various embodiments. In addition, the functionality may be embodied in whole or in part in firmware or hardware equivalents such as integrated circuits, application specific integrated circuits, field programmable gate arrays (FPGA), and the like.

The computer may operate in a networked environment using logical connections to one or more remote computers. The remote computers may each be another personal computer, a tablet, a PDA, a server, a router, a network PC, a peer device, or other common network node, and typically include many or all of the elements described above relative to the computer. The logical connections include a local area network (LAN) and a wide area network (WAN) that are presented here by way of example and not limitation. Such networking environments are commonplace in office-wide or enterprise-wide computer networks, intranets and the Internet.

When used in a LAN networking environment, the computer is connected to the local network through a network interface or adapter. When used in a WAN networking environment, the computer may include a modem, a wireless link, or other means for establishing communications over the wide area network, such as the Internet. The modem, which may be internal or external, is connected to the system bus via the serial port interface. In a networked environment, program modules depicted relative to the computer, or portions thereof, may be stored in the remote memory storage device. It will be appreciated that the network connections shown are exemplary and other means of establishing communications over wide area network may be used.

Preferably, computer-executable instructions are stored in a memory, such as the hard disk drive, and executed by the computer. Advantageously, the computer processor has the capability to perform all operations (e.g., execute computer-executable instructions) in real-time.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

Embodiments of the disclosure may be implemented with computer-executable instructions. The computer-executable instructions may be organized into one or more computer-executable components or modules. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

When introducing elements of aspects of the disclosure or the embodiments thereof, the articles "a", "an", "the" and "said" are intended to mean that there are one or more of the elements. The terms "comprising", "including", and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A monitoring system for an industrial plant comprising:
a storage unit communicatively coupled to the one or more processors and storing processor-executable instructions thereon that, when executed by the one or more processors, cause the monitoring system to:
perform a process that creates a set of training data for a machine learning model based on historical log file data and historical alarm data, the set of training data containing features to be recognized by the machine learning model and labels for the features, the labels for the features being derived from plant maintenance logs and input from subject matter experts;
perform a process that trains the machine learning model using the set of training data, the trained machine learning model configured to use neural network processing to recognize the features;
perform a process that inputs data files for the industrial plant, the data files containing data relating to nodes in the industrial plant, each node representing a device in the industrial plant, the data files for a given node including log files for the given node, the data in each data file being in a different data format;
perform a process that extracts the data from the data files, the data being extracted including timestamp, device name, device health, and message content, the message content for the given node indicating that a device error has occurred at the given node;
perform a process that converts the timestamp, the device name, the device health, and the message content from the data files into a homogenous format;
perform a process that extracts the features from the converted timestamp, device name, device health, and message content using the trained machine learning model to recognize the features, the features including error count per a given time interval experienced by the nodes;
perform a process that identifies a node in the industrial plant that is experiencing an alarm by using said trained machine learning model and the extracted features to recognize that the node is experiencing the alarm, the alarm indicating the node has failed or will fail within a specified amount of time;
perform a process that graphically displays on a dashboard an identification of the node that is experiencing the alarm along with the identification of other nodes in the industrial plant that have experienced other alarms, and further graphically displays on the dashboard a screen containing detailed information about the alarm in response to a user tapping on the identification of the node; and
perform a process that determines a time-to-failure for the alarm using said trained machine learning model and graphically displays the time-to-failure with the identification of the node on the dashboard if the time-to-failure exceeds a preset threshold;
wherein the process that determines the time-to-failure for the alarm includes assigning an initial time interval as the time-to-failure based on the data in the log files, adjusting the time-to-failure using an iterative process until a probability of the time-to-failure reaches a predefined threshold, and using the adjusted time-to-failure as the time-to-failure for the alarm;

wherein the iterative process includes determining whether the probability of the time-to-failure has reached the predefined threshold and, in response to determining that the probability of the time-to-failure has not reached the predefined threshold, interpolating the extracted features forward by a predefined time increment and re-performing: the process that identifies the node in the industrial plant that is experiencing the alarm by using said trained machine learning model and the extracted features, and the process that determines the time-to-failure for the alarm using said trained machine learning model.

2. The monitoring system of claim 1, wherein the processor-executable instructions further cause the monitoring system to perform a process that builds a network topology for the nodes in the industrial plant, the network topology establishing a hierarchy for the nodes in the industrial plant.

3. The monitoring system of claim 1, wherein the processor-executable instructions further cause the monitoring system to perform a process that graphically displays a severity level of the alarm based on time-to-failure for the alarm and/or impact of the alarm on plant operations.

4. The monitoring system of claim 1, wherein the processor-executable instructions further cause the monitoring system to perform a process that graphically displays all data within a specified time period for the node in the industrial plant that is experiencing an alarm.

5. The monitoring system of claim 1, wherein the processor-executable instructions further cause the monitoring system to perform a process that graphically displays all nodes in the industrial plant that are experiencing an alarm using said trained machine learning model to recognize the nodes.

6. The monitoring system of claim 1, wherein the processor-executable instructions further cause the monitoring system to perform a process that identifies a corrective action for the alarm from captured knowledge using said trained machine learning model to extract the corrective action, the captured knowledge including maintenance logs for the industrial plant.

7. The monitoring system of claim 1, wherein the processor-executable instructions further cause the monitoring system to extract features by performing a process that applies feature extraction rules to the converted timestamp, device name, device health, and message content using said trained machine learning model.

8. The monitoring system of claim 1, wherein at least a portion of the nodes in the industrial plant represent field devices in the industrial plant, each field device in operable communication with the one or more processors and with a data server, the data server configured to collect the data files for the industrial plant.

9. The monitoring system of claim 8, wherein the field devices comprise one or more of: sensors, actuators, motors, and valves.

10. The monitoring system of claim 1, wherein the processor-executable instructions further cause the monitoring system to perform a process that updates a processing of the machine learning model based on a user validation of a processed output of the trained machine learning model.

11. The monitoring system of claim 10, wherein the processed output of the trained machine learning model comprises a proposed future solution to at least one of a current and past health problem of the industrial plant, and wherein the processor-executable instructions further cause the monitoring system to perform a process that tracks resolution of at least one of the current and the past health problem of the industrial plant.

12. The monitoring system of claim 1, wherein the processor-executable instructions further cause the monitoring system to perform a process that continuously updates the trained machine learning model using an automated feedback and correction component in response to receiving corrections from a user, the automated feedback and correction component configured to use the corrections to improve evaluation and extraction of features from the data files.

13. A method for monitoring an industrial plant, comprising:

creating a set of training data for a machine learning model based on historical log file data and historical alarm data, the set of training data based on a matrix containing features to be recognized by the machine learning model and labels for the features, the labels for the features being derived from plant maintenance logs and input from subject matter experts;

training the machine learning model using the set of training data, the trained machine learning model configured to use neural network processing to recognize the features;

inputting data files for the industrial plant, the data files containing data relating to nodes in the industrial plant, each node representing a device in the industrial plant, the data files for a given node including log files for the given node, the data in each data file being in a different data format;

extracting the data from the data files, the data being extracted including timestamp, device name, device health, and message content, the message content for the given node indicating that a device error has occurred at the given node;

converting the timestamp, the device name, the device health, and the message content from the data files into a homogenous format;

extracting features from the converted timestamp, device name, device health, and message content using the trained machine learning model to recognize the features, the features including error count per a given time interval experienced by the nodes;

identifying a node in the industrial plant that is experiencing an alarm by using said trained machine learning model and the extracted features to recognize that the node is experiencing the alarm, the alarm indicating the node has failed or will fail within a specified amount of time;

graphically displaying on a dashboard an identification of the node that is experiencing the alarm along with the identifications of other nodes in the industrial plant that have experienced other alarms, and further graphically displaying on the dashboard a screen containing detailed information about the alarm in response to a user tapping on the identification of the node; and determining a time-to-failure for the alarm using said trained machine learning model and graphically displaying the time-to-failure with the identification of the node on the dashboard if the time-to-failure exceeds a preset threshold;

wherein determining the time-to-failure for the alarm includes assigning an initial time interval as the timeto-failure based on the data in the log files, adjusting the time-to-failure using an iterative process until a probability of the time-to-failure reaches a predefined threshold, and using the adjusted time-to-failure as the time-to-failure for the alarm;

wherein the iterative process includes determining whether the probability of the time-to-failure has reached the predefined threshold and, in response to determining that the probability of the time-to-failure has not reached the predefined threshold, interpolating the extracted features forward by a predefined time increment and re-performing: the process that identifies the node in the industrial plant that is experiencing the alarm by using said trained machine learning model and the extracted features, and the process that determines the time-to-failure for the alarm using said trained machine learning model.

14. The method of claim 13, further comprising building a network topology for the nodes in the industrial plant, the network topology establishing a hierarchy for the nodes in the industrial plant.

15. The method of claim 13, further comprising graphically displaying a severity level of the alarm based on time-to-failure for the alarm and/or impact of the alarm on plant operations.

16. The method of claim 13, further comprising graphically displaying all data within a specified time period for the node in the industrial plant that is experiencing an alarm.

17. The method of claim 13, further comprising graphically displaying all nodes in the industrial plant that are experiencing an alarm using said trained machine learning model to recognize the nodes.

18. The method of claim 13, further comprising identifying a corrective action for the alarm from captured knowledge using said trained machine learning model to extract the corrective action, the captured knowledge including maintenance logs for the industrial plant.

19. The method of claim 13, further comprising applying feature extraction rules to the converted timestamp, device name, device health, and message content using said trained machine learning model.

* * * * *